(12) United States Patent
Jin et al.

(10) Patent No.: US 12,608,974 B2
(45) Date of Patent: Apr. 21, 2026

(54) USER AWARENESS DEVICE, USER AWARENESS SYSTEM, AND USER AWARENESS METHOD

(71) Applicants:Kia Corporation, Seoul (KR); Hyundai Motor Company, Seoul (KR)

(72) Inventors: Moon Sub Jin, Yongin-si (KR); Hyeon Seok Jung, Suwon-si (KR); Kyung Hwan Cho, Anyang-si (KR)

(73) Assignees: Company, Seoul (KR); Kia Corporation, Seoul (KR)

( * ) Notice: Subject to any disclaimer, the term of this patent is extended or adjusted under 35 U.S.C. 154(b) by 471 days.

(21) Appl. No.: 18/049,308

(22) Filed: Oct. 25, 2022

(65) Prior Publication Data

US 2023/0316807 A1 Oct. 5, 2023

(30) Foreign Application Priority Data

Mar. 25, 2022 (KR) ........................ 10-2022-0037595

(51) Int. Cl.
 *G06V 40/16* (2022.01)
 *G06Q 50/40* (2024.01)
 *G06T 7/20* (2017.01)
(52) U.S. Cl.
 CPC .............. *G06V 40/172* (2022.01); *G06T 7/20* (2013.01); *G06Q 50/40* (2024.01)
(58) Field of Classification Search
 CPC ........ G06Q 50/40; G06T 7/20; G06V 40/168; G06V 40/172
 See application file for complete search history.

(56) References Cited

U.S. PATENT DOCUMENTS

| | | | |
|---|---|---|---|
| 7,373,396 B2 | 5/2008 | Sato | |
| 11,440,189 B2 | 9/2022 | Lee et al. | |
| 2002/0111988 A1 | 8/2002 | Sato | |
| 2019/0090711 A1* | 3/2019 | Lee ....................... A47L 9/2857 |
| 2019/0180138 A1 | 6/2019 | Kawase et al. | |
| 2020/0189104 A1 | 6/2020 | Lee et al. | |

FOREIGN PATENT DOCUMENTS

| | | | |
|---|---|---|---|
| JP | 2002342759 A | 11/2002 |
| JP | 2007324978 A | 12/2007 |
| JP | 2020046478 A | 3/2020 |
| KR | 20200072303 A | 6/2020 |
| KR | 20200094608 A | 8/2020 |

* cited by examiner

*Primary Examiner* — Ruiping Li
(74) *Attorney, Agent, or Firm* — Slater Matsil, LLP

(57) ABSTRACT

An embodiment user awareness device includes a processor configured to receive first information about a first user from a first device, specify the first user based on a result of comparing the first information with pre-registration information, transmit data corresponding to a first service to the first device to provide the first user with the first service based on the pre-registration information, receive data on a history of the first service from the first device, receive second information about a second user from a second device, compare the first information with the second information to determine whether the second user is the first user, and transmit data corresponding to a second service associated with the first service to the second device to provide the second user with the second service in response to the second user being the first user.

20 Claims, 8 Drawing Sheets

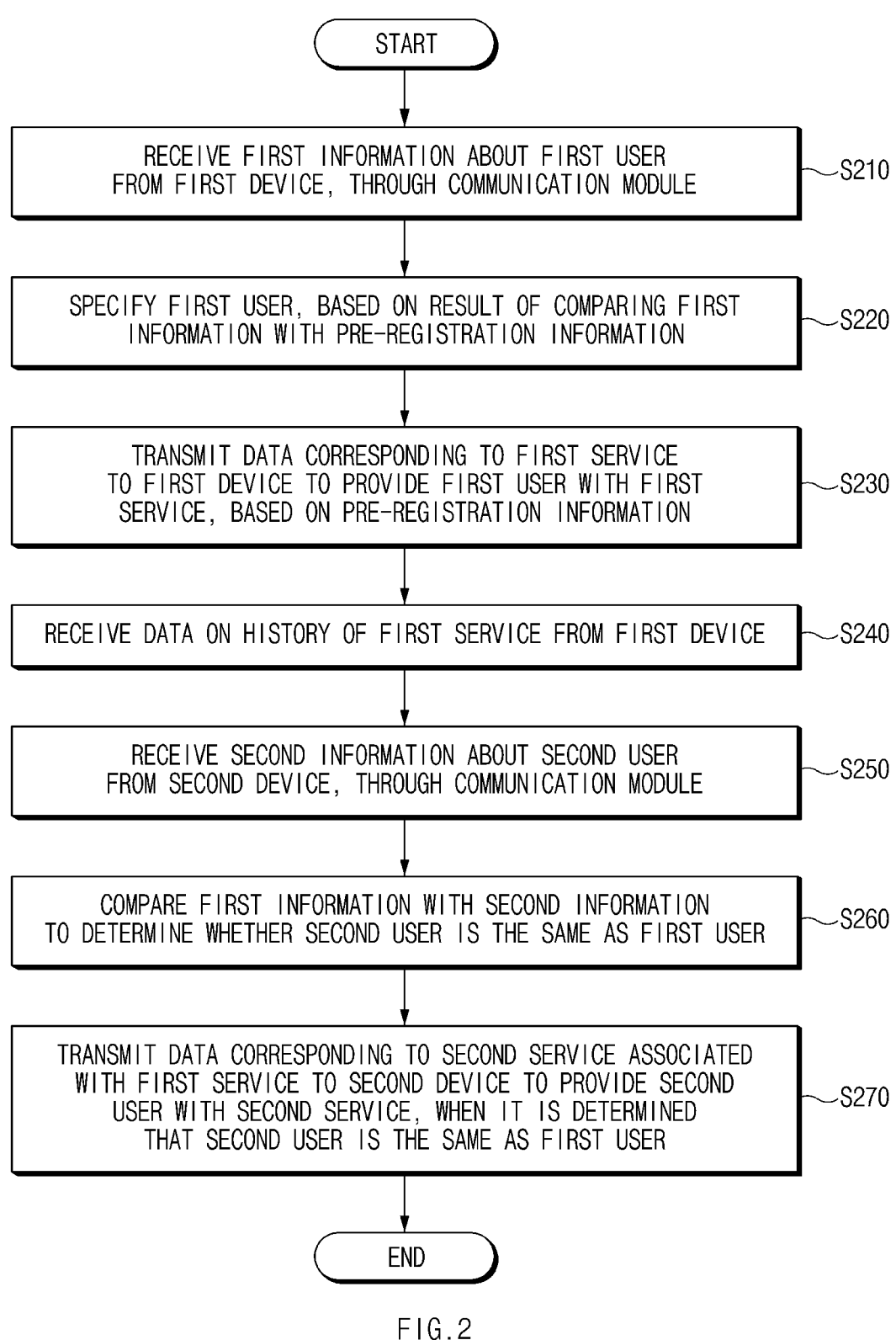

START

RECEIVE FIRST INFORMATION ABOUT FIRST USER
FROM FIRST DEVICE, THROUGH COMMUNICATION MODULE    ~S210

SPECIFY FIRST USER, BASED ON RESULT OF COMPARING FIRST
INFORMATION WITH PRE-REGISTRATION INFORMATION    ~S220

TRANSMIT DATA CORRESPONDING TO FIRST SERVICE
TO FIRST DEVICE TO PROVIDE FIRST USER WITH FIRST
SERVICE, BASED ON PRE-REGISTRATION INFORMATION    ~S230

RECEIVE DATA ON HISTORY OF FIRST SERVICE FROM FIRST DEVICE    ~S240

RECEIVE SECOND INFORMATION ABOUT SECOND USER
FROM SECOND DEVICE, THROUGH COMMUNICATION MODULE    ~S250

COMPARE FIRST INFORMATION WITH SECOND INFORMATION
TO DETERMINE WHETHER SECOND USER IS THE SAME AS FIRST USER    ~S260

TRANSMIT DATA CORRESPONDING TO SECOND SERVICE ASSOCIATED
WITH FIRST SERVICE TO SECOND DEVICE TO PROVIDE SECOND
USER WITH SECOND SERVICE, WHEN IT IS DETERMINED
THAT SECOND USER IS THE SAME AS FIRST USER    ~S270

END

USER AWARENESS DEVICE, USER AWARENESS SYSTEM, AND USER AWARENESS METHOD

CROSS-REFERENCE TO RELATED APPLICATIONS

This application claims the benefit of Korean Patent Application No. 10-2022-0037595, filed on Mar. 25, 2022, which application is hereby incorporated herein by reference.

TECHNICAL FIELD

The present disclosure relates to a user awareness device, a user awareness system, and a user awareness method.

BACKGROUND

Recently, with the development of deep learning technology, an image recognition technology has developed at a very fast speed. As such a deep learning technology is grafted onto face recognition, high-performance face recognition is possible in various data environments.

The face recognition technology is divided into a face identification technology and a face verification technology depending on its application. Face identification is a 1: N scheme of determining whether one face image received as the input corresponds to a certain person among pre-registered N persons. Face verification is a 1:1 scheme of determining whether two face images received as inputs are the same person.

Meanwhile, there has been an increase in, for example, using a robot device which recognizes a face of a user in a place such as an exhibition hall and provides the user with a service. In this case, when there are several robot devices in the same place or when there are the same robot devices in different places, there is a need to share information about a user between the robot devices.

Thus, there is a need for a technology capable of efficiently sharing user information between robot devices using a cloud.

SUMMARY

The present disclosure relates to a user awareness device, a user awareness system, and a user awareness method. Particular embodiments relate to technologies of recognizing a user and providing the user with a personalized service.

Embodiments of the present disclosure can solve problems occurring in the prior art while advantages achieved by the prior art are maintained intact.

An embodiment of the present disclosure provides a user awareness device for verifying and tracking a user after identifying the user to improve the reliability of awareness and ensure real-time performance, a user awareness system, and a user awareness method.

Another embodiment of the present disclosure provides a user awareness device for providing a service personalized for position tracking and interests for users in an exhibition hall by sharing user information using a cloud between guide robots in the exhibition hall, a user awareness system, and a user awareness method.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a user awareness device may include a communication module and at least one processor electrically connected with the communication module. The at least one processor may receive first information about a first user from a first device, through the communication module, may specify the first user, based on a result of comparing the first information with pre-registration information, may transmit data corresponding to a first service to the first device to provide the first user with the first service based on the pre-registration information, may receive data on a history of the first service from the first device, through the communication module, may receive second information about a second user from a second device, through the communication module, may compare the first information with the second information to determine whether the second user is the same as the first user, and may transmit data corresponding to a second service associated with the first service to the second device to provide the second user with the second service, when it is determined that the second user and the first user are the same.

In an embodiment, the pre-registration information may include at least one of name information, age information, gender information, face information, preferred vehicle information, or visit information. Each of the first information and the second information may include at least one of appearance information, face information, utterance information, touch information, age information, or gender information. The data on the history of the first service may include at least one of information about the first service, trial ride information of the first user about the first service, or behavior information of the first user about the first service.

In an embodiment, the second service may include a service personalized for the second user based on the data on the history of the first service.

In an embodiment, the at least one processor may receive a request to search for the second user from the second device, through the communication module and may determine whether the second user is the same as the first user, in response to the request.

In an embodiment, the at least one processor may obtain motion information of the first user using deep-learning and may determine whether the second user is the same as the first user, based on the motion information of the first user.

In an embodiment, the at least one processor may obtain interest information about the first user based on at least one of the first information or the data on the history of the first service and may update the interest information in a cloud such that the interest information is shared.

In an embodiment, each of the first device and the second device may include one of a robot device or a vehicle. The at least one processor may obtain the data on the history of the first service, the data including at least one of a driver tendency, a driving distance, or a driving speed, from the first device, when the first device is the vehicle.

According to another embodiment of the present disclosure, a user awareness system may include a first device that recognizes a first user, obtains first information about the first user, and provides the first user with a first service, a second device that recognizes a second user, obtains second information about the second user, and provides the second user with a second service, and a server that receives the first information from the first device, specifies the first user, based on a result of comparing the first information with pre-registration information, transmits data corresponding to the first service to the first device to provide the first user with the first service based on the pre-registration information, receives data on a history of the first service from the first device, receives the second information from the second device, compares the first information with the second information to determine whether the second user is the same as the first user, and transmits data corresponding to the second service associated with the first service to the second device to provide the second user with the second service, when it is determined that the second user and the first user are the same.

In an embodiment, the pre-registration information may include at least one of name information, age information, gender information, face information, preferred vehicle information, or visit information. Each of the first information and the second information may include at least one of appearance information, face information, utterance information, touch information, age information, or gender information. The data on the history of the first service may include at least one of information about the first service, trial ride information of the first user about the first service, or behavior information of the first user about the first service.

In an embodiment, the second service may include a service personalized for the second user based on the data on the history of the first service.

In an embodiment, the server may receive a request to search for the second user from the second device and may determine whether the second user is the same as the first user, in response to the request.

In an embodiment, the server may obtain motion information of the first user using deep-learning and may determine whether the second user is the same as the first user, based on the motion information of the first user.

In an embodiment, the server may obtain interest information about the first user based on at least one of the first information or the data on the history of the first service and may update the interest information in a cloud such that the interest information is shared.

In an embodiment, each of the first device and the second device may include one of a robot device or a vehicle. The server may obtain the data on the history of the first service, the data including at least one of a driver tendency, a driving distance, or a driving speed, from the first device, when the first device is the vehicle.

According to another embodiment of the present disclosure, a user awareness method may include receiving, by at least one processor, first information about a first user from a first device, through a communication module, specifying, by the at least one processor, the first user, based on a result of comparing the first information with pre-registration information, transmitting, by the at least one processor, data corresponding to a first service to the first device to provide the first user with the first service based on the pre-registration information, receiving, by the at least one processor, data on a history of the first service from the first device, through the communication module, receiving, by the at least one processor, second information about a second user from a second device, through the communication module, comparing, by the at least one processor, the first information with the second information to determine whether the second user is the same as the first user, and transmitting, by the at least one processor, data corresponding to a second service associated with the first service to the second device to provide the second user with the second service, when it is determined that the second user and the first user are the same.

In an embodiment, the pre-registration information may include at least one of name information, age information, gender information, face information, preferred vehicle information, or visit information. Each of the first information and the second information may include at least one of appearance information, face information, utterance information, touch information, age information, or gender information. The data on the history of the first service may include at least one of information about the first service, trial ride information of the first user about the first service, or behavior information of the first user about the first service.

In an embodiment, the second service may include a service personalized for the second user based on the data on the history of the first service.

In an embodiment, the determining of whether the second user is the same as the first user may include receiving, by the at least one processor, a request to search for the second user from the second device, through the communication module, and determining, by the at least one processor, whether the second user is the same as the first user, in response to the request.

In an embodiment, the determining of whether the second user is the same as the first user may include obtaining, by the at least one processor, motion information of the first user using deep-learning and determining, by the at least one processor, whether the second user is the same as the first user, based on the motion information of the first user.

In an embodiment, the user awareness method may further include obtaining, by the at least one processor, interest information about the first user based on at least one of the first information or the data on the history of the first service and updating, by the at least one processor, the interest information in a cloud such that the interest information is shared.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 2 is a flowchart illustrating a user awareness method according to an embodiment of the present disclosure;

DETAILED DESCRIPTION OF ILLUSTRATIVE EMBODIMENTS

Figure 1:
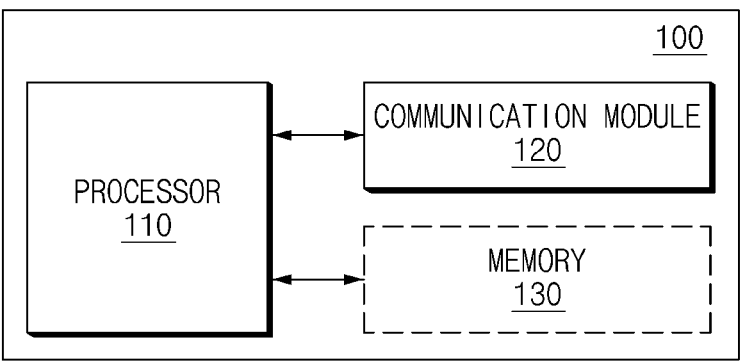
FIG. 1 is a block diagram of a user awareness device according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram of a user awareness device according to an embodiment of the present disclosure.

Referring to FIG. 1, a user awareness device 100 according to an embodiment may include a processor 110, a communication module 120, and a memory 130. In various embodiments, the user awareness device 100 may include an additional component other than the components shown in FIG. 1, or may omit at least one of the components shown in FIG. 1.

According to an embodiment, the processor 110 may control the overall operation of the user awareness device 100. According to an embodiment, the processor 110 may be electrically connected with the communication module 120 and the memory 130 and may electrically control the respective components. The processor 110 may be an electrical circuit which executes instructions of software and may perform a variety of data processing and calculation described below.

For example, the processor 110 may control operations of the user awareness device 100 by executing programs stored in the memory 130. According to an embodiment, the processor 110 may execute calculation and data processing about control and/or communication of at least one other component of the user awareness device 100 using instructions stored in the memory 130. Detailed contents associated with an operation of the processor 110 will be described below with reference to FIGS. 2 to 7.

According to an embodiment, the communication module 120 may receive information obtained from an external device outside the user awareness device 100.

According to an embodiment, the communication module 120 may transmit a command for controlling the external device outside the user awareness device 100 or information necessary for an operation of the external device to the external device.

According to an embodiment, the communication module 120 may include at least one of a mobile communication module, a wireless Internet module, or a short-range communication module for communicating with at least one device, a server, and a cloud.

According to an embodiment, the mobile communication module may support communication over a mobile communication network established according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like), 4th generation (4G) mobile telecommunication, or 5th generation (5G) mobile telecommunication.

According to an embodiment, the wireless Internet module may be a module for wireless Internet access, which may support communication through wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

According to an embodiment, the short-range communication module may support short-range communication using at least one of Bluetooth™, radio frequency identification (RFID), infrared data association (IrDA), ultra wideband (UWB), ZigBee, near field communication (NFC), and wireless universal serial bus (USB) technologies.

According to an embodiment, the memory 130 may store a program for processing and control of the processor 110 and may store data which is input to the user awareness device 100 or is output from the user awareness device 100.

According to an embodiment, the memory 130 may store pre-registration information. For example, the pre-registration information may be information which is previously input by the user through an application. Furthermore, for example, the pre-registration information may include at least one of name information, age information, gender information, face information, preferred vehicle information, or visit information of the user.

According to an embodiment, the memory 130 may store information obtained from the external device outside the user awareness device 100.

For example, the information obtained from the external device may include at least one of appearance information, face information, utterance information, touch information, age information, or gender information of the user, which is recognized by the external device.

Furthermore, for example, the information obtained from the external device may include at least one of information about a service provided by the external device, trial ride information of the user about the service provided by the external device, or behavior information of the user about the service provided by the external device.

According to an embodiment, the memory 130 may include at least one type of storage medium, such as a flash memory type memory, a hard disk type memory, a multimedia card micro type memory, a card type memory (e.g., a secure digital (SD) card or an extreme digital (XD) card), a random access memory (RAM), a static RAM (SRAM), a read-only memory (ROM), an electrically erasable programmable ROM (EEPROM), a programmable ROM (PROM), a magnetic memory, a magnetic disk, and an optical disk.

FIG. 2 is a flowchart illustrating a user awareness method according to an embodiment of the present disclosure.

Operations in S210 to S270 in an embodiment below may be sequentially performed, but are not necessarily sequentially performed. For example, an order of the respective operations may be changed, and at least two operations may be performed in parallel.

Referring to FIG. 2, in a user awareness device and a user awareness method according to an embodiment, in S210, a processor may receive first information about a first user from a first device, through a communication module.

According to an embodiment, the first device may include one of a robot device or a vehicle.

According to an embodiment, the processor may receive the first information about the first user in a certain first space from the first device in the first space, through the communication module.

According to an embodiment, the first information may include at least one of appearance information, face information, utterance information, touch information, age information, or gender information of the first user. However, the first information is not limited thereto, which may include various pieces of information recognized (or obtained) from the first user by the first device.

According to an embodiment, in S220, the processor may specify the first user based on a result of comparing the first information with pre-registration information.

According to an embodiment, the processor may receive the first information about the first user from the first device and may compare the received first information with the pre-registration information.

According to an embodiment, the pre-registration information may include at least one of name information, age information, gender information, face information, preferred vehicle information, or visit information of at least one user. For example, the pre-registration information may be input by the user through an application to be stored in a cloud. Furthermore, for example, the pre-registration information may be stored in a memory.

According to an embodiment, when it is determined that the pre-registration information about at least one user and the first information correspond to each other, the processor may specify the first user. According to an embodiment, when it is determined that information about the first user is pre-registered, the processor may specify the first user.

According to an embodiment, in S230, the processor may provide the first device with data corresponding to a first service to provide the first user with the first service based on the pre-registration information.

According to an embodiment, the data corresponding to the first service may be determined based on the pre-registration information. For example, the processor may determine the data corresponding to the first service based on the preferred vehicle information included in the pre-registration information.

According to an embodiment, when the first device is a robot device, it may provide the first user with the first service for guiding the first user to a vehicle the first user prefers, based on the pre-registration information. For example, the first device may guide the first user to the vehicle the first user prefers by means of a voice or a message.

According to an embodiment, when the first device is a vehicle, it may provide a personalized screen or a personalized voice, based on the pre-registration information.

For example, the personalized screen or the personalized voice may include a message (e.g., a welcome message) including information of the first user.

According to an embodiment, in S240, the processor may receive data on a history of the first service from the first device.

According to an embodiment, the processor may receive the data on the history of the first service from the first device through the communication module.

According to an embodiment, the data on the history of the first service may include at least one of information about the first service, trial ride information of the first user about the first service, or behavior information of the first user about the first service.

For example, the information about the first service may include data on contents of the first service.

According to an embodiment, when the first device is the vehicle, the data on the history of the first service may include at least one of a driver tendency, a driving distance, or a driving speed.

According to an embodiment, the processor may store the data on the history of the first service, which is received from the first device, in the memory.

According to an embodiment, the processor may update the data on the history of the first service, which is received from the first device, in the cloud.

According to an embodiment, in S250, the processor may receive second information about a second user from a second device, through the communication module.

According to an embodiment, the second device may include one of a robot device or a vehicle.

According to an embodiment, the processor may receive the second information about the second user in a certain second space from the second device in the second space, through the communication module.

According to an embodiment, the second information may include at least one of appearance information, face information, utterance information, touch information, age information, or gender information of the second user. However, the second information is not limited thereto, which may include various pieces of information recognized (or obtained) from the second user by the second device.

According to an embodiment, in S260, the processor may compare the first information with the second information to determine whether the second user is the same as the first user.

According to an embodiment, the processor may obtain the first information from the cloud and may compare the obtained first information with the second information received from the second device.

According to an embodiment, the processor may determine whether the second information corresponds to the first information.

According to an embodiment, the processor may determine whether the second user is the same as the first user using a re-awareness algorithm.

According to an embodiment, the processor may determine whether the second user is the same as the first user, based on motion information of the first user, which is obtained using deep-learning. For example, the processor may track a movement line of the first user by means of deep-learning and may determine whether the second user is the same as the first user.

According to an embodiment, when it is determined that the second user and the first user are the same as each other, in S270, the processor may transmit data corresponding to a second service associated with the first service to the second device to provide the second user with the second service.

According to an embodiment, when it is determined that the second information corresponds to the first information, the processor may determine that the first user and the second user are the same.

According to an embodiment, the processor may determine that the second user is the same as the first user using the re-awareness algorithm. For example, the processor may track a movement line of the first user by means of deep-learning and may determine that the second user is the same as the first user.

According to an embodiment, the data corresponding to the second service may be determined based on the data on the history of the first service. For example, the processor may determine the data corresponding to the second service based on at least one of the information about the first service, the trial ride information of the first user about the first service, or the behavior information of the first user about the first service.

According to an embodiment, the second service may include a service personalized for the second user based on the data on the history of the first service.

For example, the second service may include a service consecutive (or subsequent) to the first service. Furthermore, for example, the second service may include a service which is not duplicated with the first service.

According to an embodiment, the second device may provide the second user with the second service which is not duplicated with the first service, based on the data on the history of the first service. For example, the second device may provide the second user with the second service by means of a voice or a message.

Figure 3:
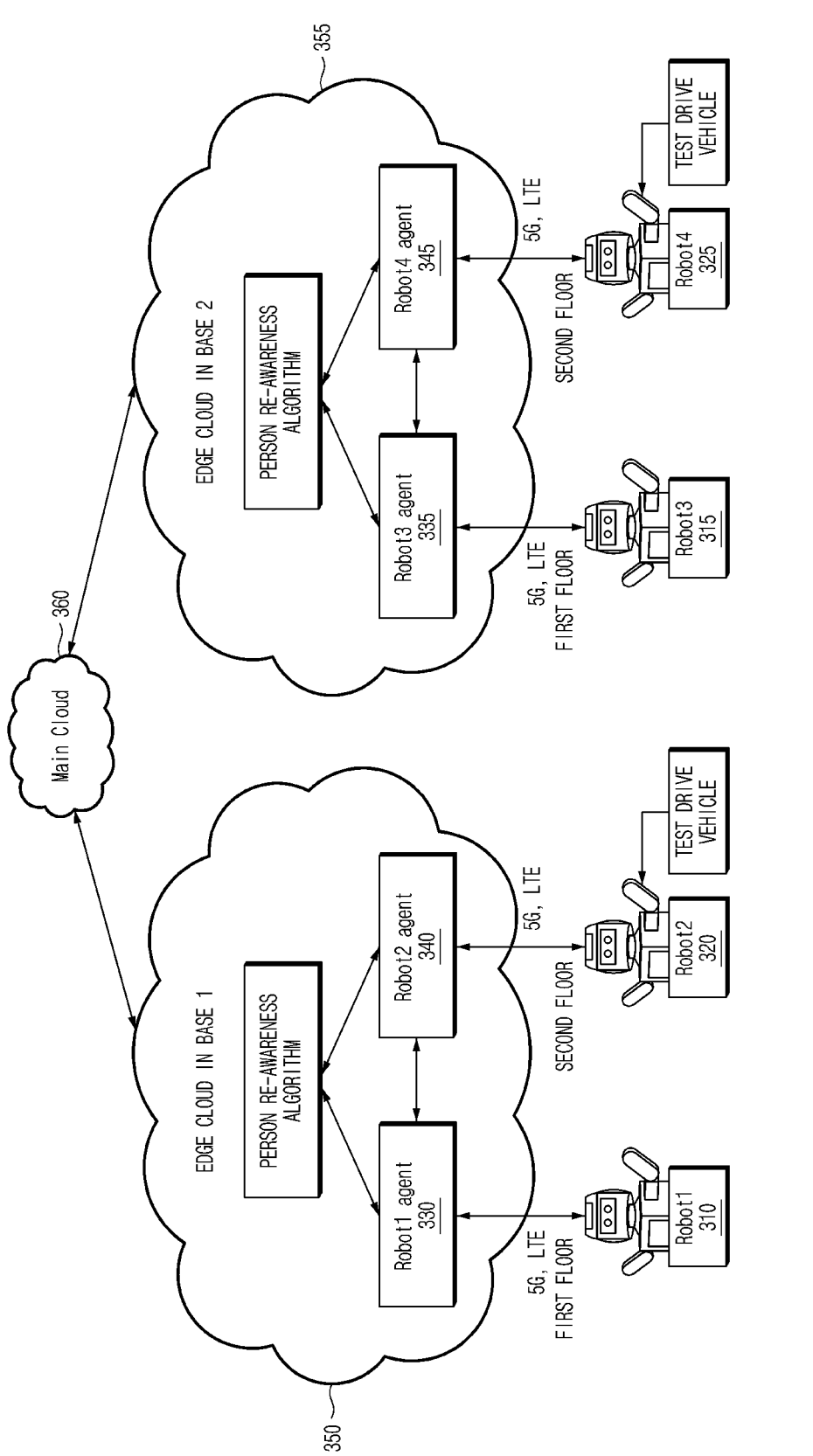
FIG. 3 is a drawing illustrating that devices recognize a user using information shared through a cloud, in a user awareness device, a user awareness system, and a user awareness method according to an embodiment of the present disclosure.

FIG. 3 is a drawing illustrating that devices recognize a user using information shared through a cloud in a user awareness device, a user awareness system, and a user awareness method according to an embodiment of the present disclosure. Contents, which are duplicated with or correspond to the contents described above in conjunction with contents of FIG. 3, may be briefly described or omitted.

Referring to FIG. 3, in a user awareness device, a user awareness system, and a user awareness method according to an embodiment, user awareness may be performed using a first device 310, a second device 320, a first server 350, a third device 315, a fourth device 325, and a second server 355.

In various embodiments, the user awareness may be performed by using an additional component other than the components shown in FIG. 3, or omitting at least one of the components shown in FIG. 3.

In the user awareness device, the user awareness system, and the user awareness method according to an embodiment, the first server 350 at a first base may obtain user information about a first user in a certain first space from the first device 310.

According to an embodiment, the first server 350 may include a first cloud server 330 and a second cloud server 340.

For example, the first device 310 may include at least one of a robot device or a vehicle. Furthermore, for example, the first device 310 may be present on a first floor of the first base to obtain user information about the first user on the first floor.

According to an embodiment, the first device 310 may provide the first user with a service based on the pre-registered information.

According to an embodiment, the first device 310 may transmit the user information about the first user to the first cloud server 330. For example, the first device 310 may transmit the user information about the first user to the first cloud server 330 using a 5G or LTE communication scheme.

According to an embodiment, the first server 350 may process the user information. For example, the first server 350 may obtain a level of interest of the user based on at least one of appearance information, face information, utterance information, touch information, age information, gender information, trial ride information, or behavior information of the user. In this case, at least one of the trial ride information or the behavior information of the user may be collected from a test drive vehicle of the user in each base.

According to an embodiment, the first server 350 may update the obtained level of interest of the user in a main cloud 360 through a communication module.

According to an embodiment, the second device 320 may request the first cloud server 330 to search for a user in a certain second space.

For example, the second device 320 may include a robot device. Furthermore, for example, the second device 320 may be present on a second floor of the first base to obtain user information about a second user on the second floor.

According to an embodiment, the first server 350 may determine whether the second user in the second space and the first user in the first space are the same as each other, using a user re-awareness algorithm.

For example, the first server 350 may determine whether the user on the first floor and the user on the second floor are the same as each other using the user re-awareness algorithm. At this time, the first server 350 may use the user re-awareness algorithm in only the first base.

According to an embodiment, when it is determined that the user in the second space and the user in the first space are the same as each other, the first server 350 may transmit at least one of the determined result or the level of interest of the user to the second cloud server 340.

According to an embodiment, the second device 320 may receive at least one of the determined result or the level of interest of the user from the second cloud server 340.

According to an embodiment, the second device 320 may provide the second user with a service, based on the received level of interest of the user.

In the user awareness device, the user awareness system, and the user awareness method according to an embodiment, the second server 355 in the second base may identify the information of the user or the level of interest of the user, which is updated in the main cloud 360.

According to an embodiment, the third device 315 may provide the user with the service, based on the information of the user or the level of interest of the user, which is updated in the main cloud 360.

For example, the third device 315 may provide the service based on a history of the service provided to the user at another point (e.g., the first base). For example, the third device 315 may provide the user with a guidance message such as "May I guide you to the Grandeur you saw last time?", "Would you like to test drive another car?", or "There is no Grandeur in this exhibition hall."

According to an embodiment, the second server 355 may obtain user information about a third user in a certain third space from the third device 315.

According to an embodiment, the second server 355 may be a concept which includes a third cloud server 335 and a fourth cloud server 345.

For example, the third device 315 may include at least one of a robot device or a vehicle. Furthermore, for example, the third device 315 may be present on a first floor of the second base to obtain user information about the third user on the first floor. Herein, the third user may include a user, user information of which is obtained in the first base.

According to an embodiment, the third device 315 may transmit the user information about the third user to the third cloud server 335. For example, the third device 315 may transmit the user information about the third user to the third cloud server 335 using a 5G or LTE communication scheme.

According to an embodiment, the second server 355 may process the user information. For example, the second server 355 may obtain a level of interest of the user based on at least one of appearance information, face information, utterance information, touch information, age information, gender information, trial ride information, or behavior information of the user. In this case, at least one of the trial ride information or the behavior information of the user may be collected from a test drive vehicle of the user in each base.

According to an embodiment, the second server 355 may update the obtained level of interest of the user in the main cloud 360 through the communication module.

According to an embodiment, the fourth device 325 may request the third cloud server 335 to search for a user in a certain fourth space.

For example, the fourth device 325 may include a robot device. Furthermore, for example, the fourth device 325 may be present on a second floor of a second base to obtain user information about a fourth user on the second floor.

According to an embodiment, the second server 355 may determine whether the fourth user in the fourth space (e.g., the second floor) and the third user in the third space (e.g., the first floor) are the same as each other, using the user re-awareness algorithm.

For example, the second server 355 may determine whether the user on the first floor and the user on the second floor are the same as each other using the user re-awareness algorithm. At this time, the second server 355 may use the user re-awareness algorithm in only the second base.

According to an embodiment, when it is determined that the user in the fourth space and the user in the third space are the same as each other, the second server 355 may transmit at least one of the determined result or the level of interest of the user to the fourth cloud server 345.

According to an embodiment, the fourth device 325 may receive at least one of the determined result or the level of interest of the user from the fourth cloud server 345.

According to an embodiment, the fourth device 325 may provide the fourth user with a service, based on the received level of interest of the user.

Figure 4:
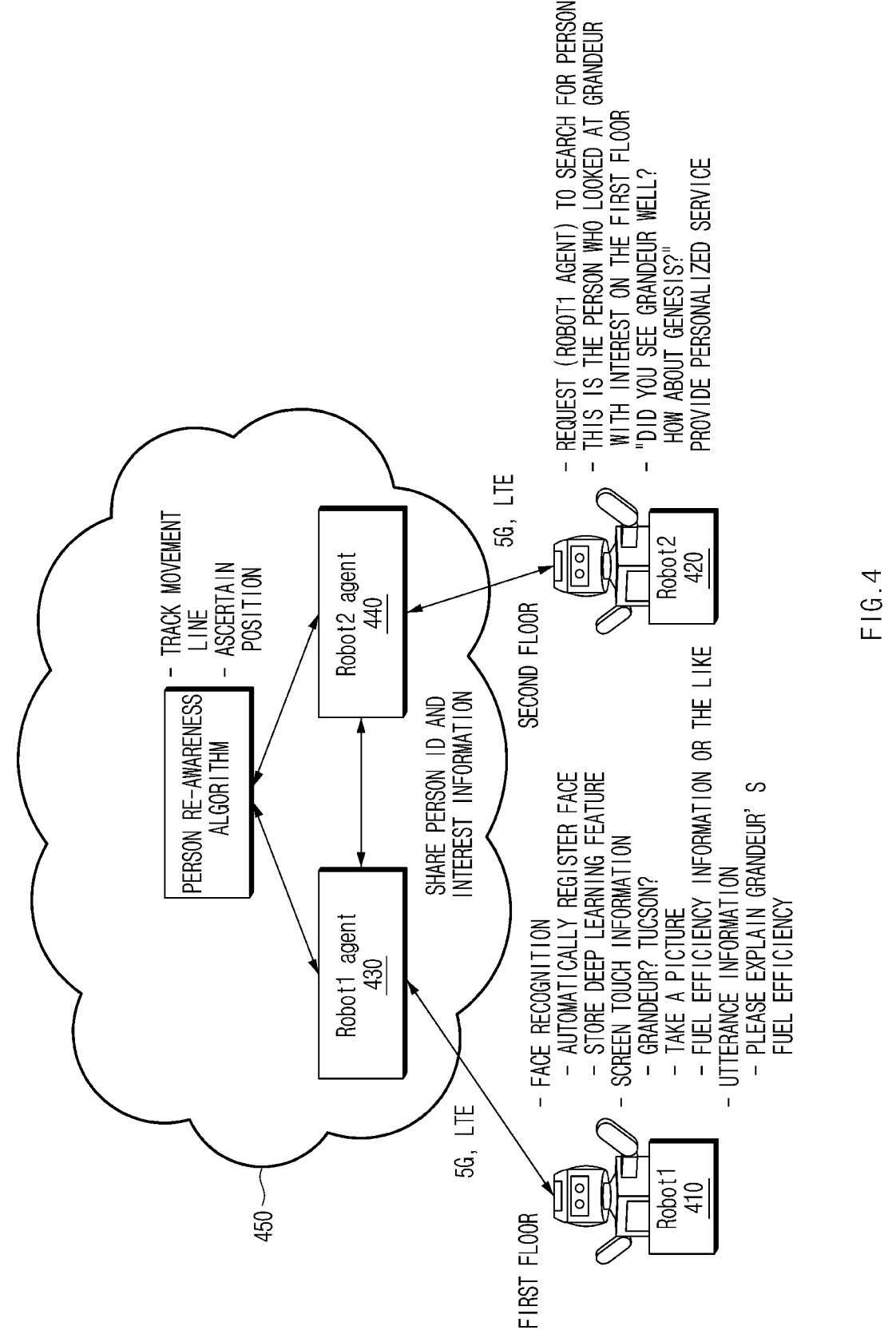
FIG. 4 is a drawing illustrating that a user awareness system recognizes a user according to an embodiment of the present disclosure.

FIG. 4 is a drawing illustrating that a user awareness system recognizes a user according to an embodiment of the present disclosure.

Contents, which are duplicated with or correspond to the contents described above in conjunction with contents of FIG. 4, may be briefly described or omitted.

Referring to FIG. 4, the user awareness system according to an embodiment may include a first device 410, a second device 420, and a server 450. According to an embodiment, the server 450 may be a concept including a first cloud server 430 and a second cloud server 440.

In various embodiments, the user awareness device may include an additional component other than the components shown in FIG. 4, or may omit at least one of the components shown in FIG. 4.

Contents, which are duplicated with or correspond to the contents described above in conjunction with contents of FIG. 4, may be briefly described or omitted.

According to an embodiment, the first device 410 may obtain first information about a first user in a certain first space (e.g., a first floor).

According to an embodiment, the first device 410 may provide the first user with a first service.

According to an embodiment, the first device 410 may provide the first user with the first service based on the pre-registered information.

According to an embodiment, the first device 410 may transmit the first information to the first cloud server 430. For example, the first device 410 may transmit the first information to the first cloud server 430 using a 5G or LTE communication scheme.

According to an embodiment, the first information may include at least one of face information, screen touch information, or utterance information.

For example, the first device 410 may automatically register a face of the first user. Furthermore, for example, the first device 410 may store feature information of the face of the first user using deep-learning.

For example, the first device 410 may store screen touch information including at least one selected vehicle or fuel efficiency information, in response to an input (e.g., a screen touch) of the first user.

For example, the first device 410 may store information about an utterance (e.g., "Please explain Grandeur's fuel efficiency") of the first user.

According to an embodiment, the second device 420 may request the first cloud server 430 to search for a user in a certain second space (e.g., a second floor).

According to an embodiment, the server 450 may determine whether a second user in the second space and the first user in the first space are the same as each other, using a user re-awareness algorithm.

For example, the server 450 may determine whether the user on the first floor and the user on the second floor are the same as each other using the user re-awareness algorithm. At this time, the server 450 may use the user re-awareness algorithm of tracking a movement line of the user and identifying a position of the user.

According to an embodiment, when it is determined that the user in the second space and the user in the first space are the same as each other, the server 450 may transmit at least one of user identification (ID) information or a level of interest of the user to the second cloud server 440.

According to an embodiment, the second device 420 may receive at least one of the user ID information or the level of interest of the user from the second cloud server 440.

According to an embodiment, the second device 420 may provide the second user with a service, based on the received level of interest of the user.

According to an embodiment, the second device 420 may provide a personalized service to a user who has a high level of interest of a specific vehicle in the first space (e.g., the first floor). For example, the second device 420 may provide the user with a guidance message such as "Did you see Grandeur well? How about Genesis?"

Figure 5:
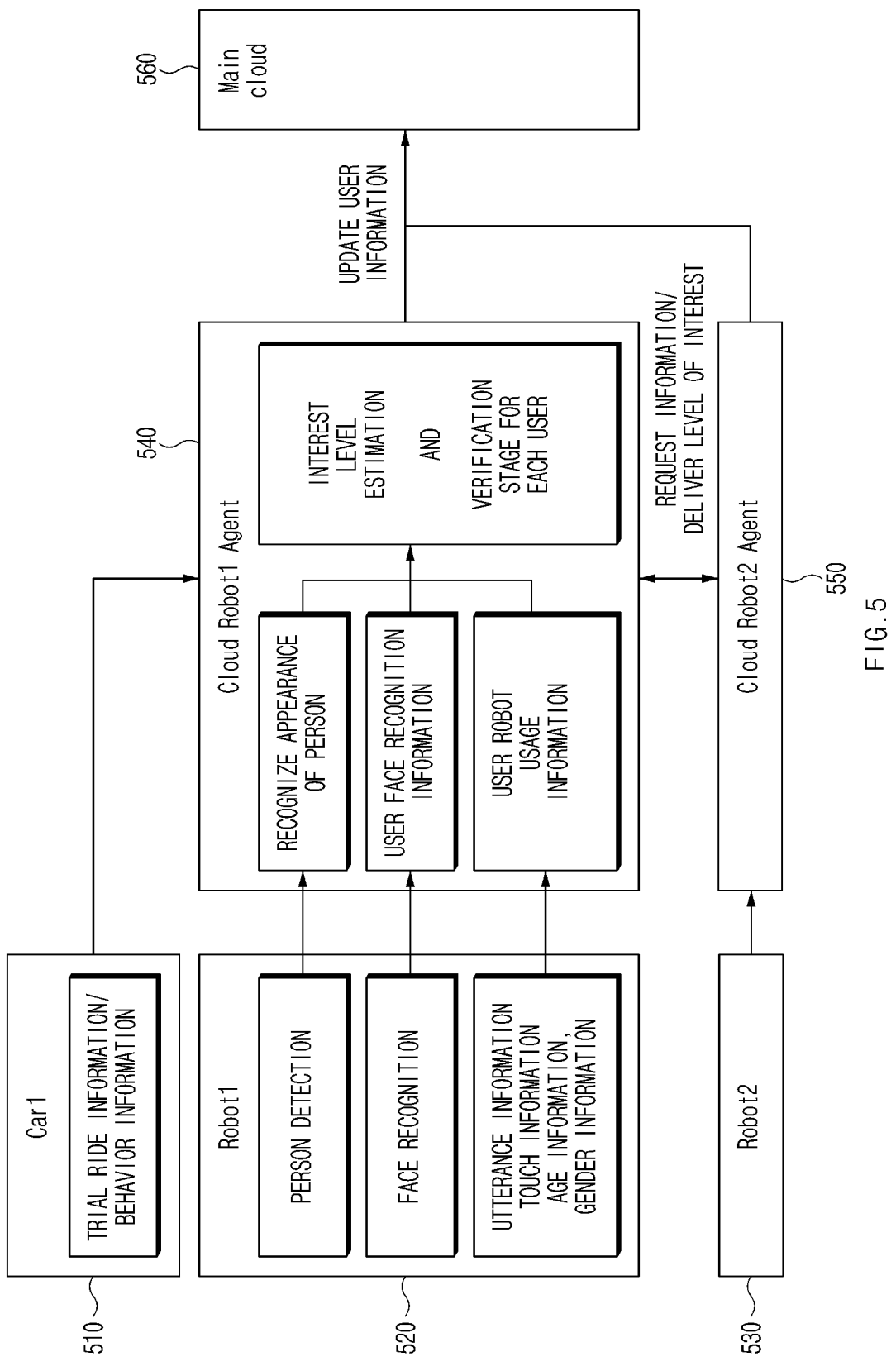
FIG. 5 is a drawing illustrating an algorithm of recognizing a user in a user awareness device, a user awareness system, and a user awareness method according to an embodiment of the present disclosure.

FIG. 5 is a drawing illustrating an algorithm of recognizing a user in a user awareness device, a user awareness system, and a user awareness method according to an embodiment of the present disclosure. Contents, which are duplicated with or correspond to the contents described above in conjunction with contents of FIG. 5, may be briefly described or omitted.

Referring to FIG. 5, in the user awareness device, the user awareness system, and the user awareness method according to an embodiment, at least one of a first car 510 or a first robot 520 may transmit user information to a first cloud server 540.

According to an embodiment, the first car 510 may transmit at least one of trial ride information or behavior information of a first user to the first cloud server 540.

According to an embodiment, the first robot 520 may detect the first user to obtain appearance information of the first user. According to an embodiment, the first robot 520 may recognize a face of the first user to obtain user face recognition information. According to an embodiment, the first robot 520 may obtain utterance information, touch information, age information, and/or gender information of the first user from the first user.

According to an embodiment, the first robot 520 may transmit appearance information, user face recognition information, utterance information, touch information, age information, and/or gender information of the first user to the first cloud server 540.

According to an embodiment, the first cloud server 540 may estimate a level of interest for each user using the appearance information, the user face recognition information, the utterance information, the touch information, the age information, and/or the gender information of the first user.

According to an embodiment, the first cloud server 540 may update information about the level of interest for each user, which is obtained based on the appearance information, the user face recognition information, the utterance information, the touch information, the age information, and/or the gender information of the first user, in the main cloud 560.

According to an embodiment, a second robot 530 may detect a second user. According to an embodiment, the second robot 530 may recognize a face of the second user.

According to an embodiment, the second robot 530 may request information about the second user from the first cloud server 540 through a second cloud server 550.

According to an embodiment, the first cloud server 540 may determine whether the second user is the same as the first user, in response to the request for the information about the second user.

According to an embodiment, when it is determined that the second user is the same as the first user, the first cloud server 540 may transmit information about a level of interest of the second user to the second cloud server 550.

According to an embodiment, the second robot 530 may provide the second user with a personalized service, based on the information about the level of interest of the second user.

For example, the second robot 530 may notify the second user of contents about previous trial ride information. Furthermore, for example, the second robot 530 may guide the second user to use a service by means of a voice.

Figure 6:
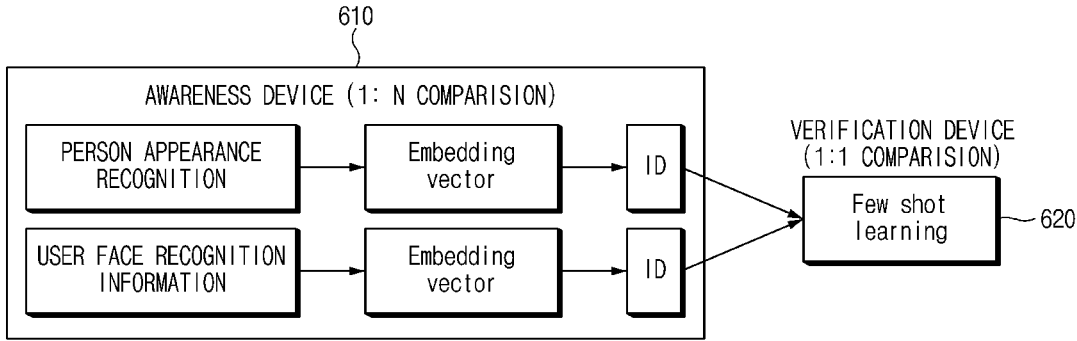
FIG. 6 is a drawing illustrating an algorithm of recognizing and verifying a user in a user awareness device according to an embodiment of the present disclosure.

FIG. 6 is a drawing illustrating an algorithm of recognizing and verifying a user in a user awareness device according to an embodiment of the present disclosure.

Referring to FIG. 6, the user awareness device may include an awareness device 610 and a verification device 620.

According to an embodiment, at least one processor in the user awareness device may be electrically connected with the awareness device 610 and the verification device 620 to control the awareness device 610 and the verification device 620.

According to an embodiment, the awareness device 610 may identify who a person in the input image is most similar to among persons previously stored in an internal database (DB).

According to an embodiment, the awareness device 610 may detect an appearance of the person (e.g., the user) in the input image. According to an embodiment, the awareness device 610 may detect the appearance and may extract feature points from the detected appearance.

According to an embodiment, the awareness device 610 may configure an embedding vector corresponding to the feature points of the appearance. According to an embodiment, the awareness device 610 may generate an ID corresponding to the embedding vector of the appearance.

According to an embodiment, the awareness device 610 may recognize a face of the person in the input image to obtain face recognition information. According to an embodiment, the awareness device 610 may recognize the face and may extract feature points from the recognized face.

According to an embodiment, the awareness device 610 may configure an embedding vector corresponding to the feature points of the face. According to an embodiment, the awareness device 610 may generate an ID corresponding to the embedding vector of the face.

According to an embodiment, the awareness device 610 may identify one image among a plurality of pre-registered images, based on the ID corresponding to the embedding vector of the appearance and the ID corresponding to the embedding vector of the face.

According to an embodiment, the verification device 620 may verify whether the person in the input image and a person in the image identified by the awareness device 610 are the same as each other, using a first scheme (e.g., a few shot learning scheme).

According to an embodiment, the verification device 620 may learn the embedding vector of the appearance and the embedding vector of the face. According to an embodiment, the verification device 620 may verify whether the person in the input image and the person in the image identified by the awareness device 610 are the same as each other in a manner which compares a similarity between the embedding vector of the input image and the embedding vector of the image identified by the awareness device 610.

Figure 7:
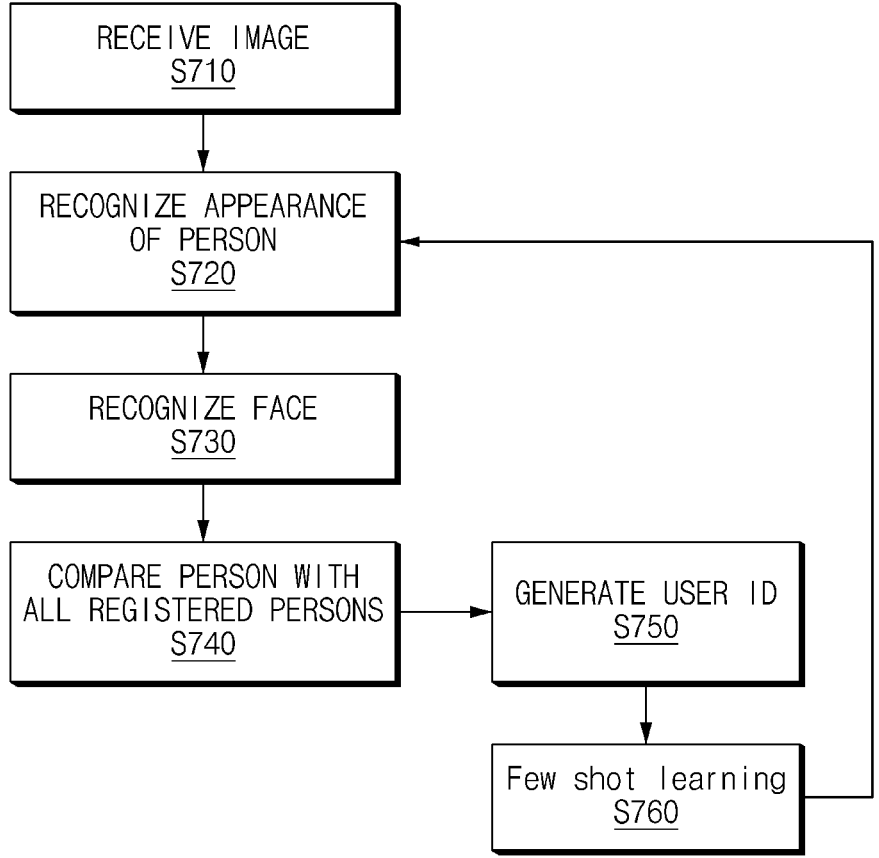
FIG. 7 is a drawing illustrating an algorithm of re-recognizing a user in a user awareness device according to an embodiment of the present disclosure.

FIG. 7 is a drawing illustrating an algorithm of re-recognizing a user in a user awareness device according to an embodiment of the present disclosure.

Referring to FIG. 7, in S710, a processor in the user awareness device may receive an image.

According to an embodiment, the processor may receive an image including a person. For example, the processor may receive an image including a user recognized by a robot device.

According to an embodiment, in S720, the processor may recognize an appearance of the person included in the received image.

According to an embodiment, the processor may extract feature points of the appearance of the user included in the received image.

According to an embodiment, the processor may extract the feature points of the appearance of the user included in the received image to obtain appearance information of the user.

According to an embodiment, in S730, the processor may recognize a face of the person included in the received image.

According to an embodiment, the processor may extract feature points of the face of the user included in the received image.

According to an embodiment, the processor may extract the feature points of the face of the user included in the received image to obtain face information of the user.

According to an embodiment, in S740, the processor may compare the person included in the received image with all pre-registered persons.

According to an embodiment, the processor may compare the user with all the pre-registered persons, based on appearance information and face information of the user included in the received image.

According to an embodiment, the processor may compare the user with all the pre-registered persons to specify one person. For example, the processor may specify one person determined as being the same as the user among all the pre-registered persons.

According to an embodiment, in S750, the processor may generate a user ID for the person included in the received image.

According to an embodiment, the processor may generate the user ID for the specified one person as a result of comparing the user with all the pre-registered persons. For example, the processor may generate the user ID for the one person determined as being the same as the user among all the pre-registered persons.

According to an embodiment, in S760, the processor may verify the person included in the received image, using a first scheme (e.g., a few shot learning scheme).

According to an embodiment, the processor may verify the user included in the received image and the specified one user.

According to an embodiment, the processor may compare whether the user included in the received image and the specified one user are the same as each other in real time.

According to an embodiment, when it is determined that the user included in the received image and the specified one user are not the same as each other, the processor may restart to recognize the user (e.g., the appearance or the face) to register the user included in the received image.

Figure 8:
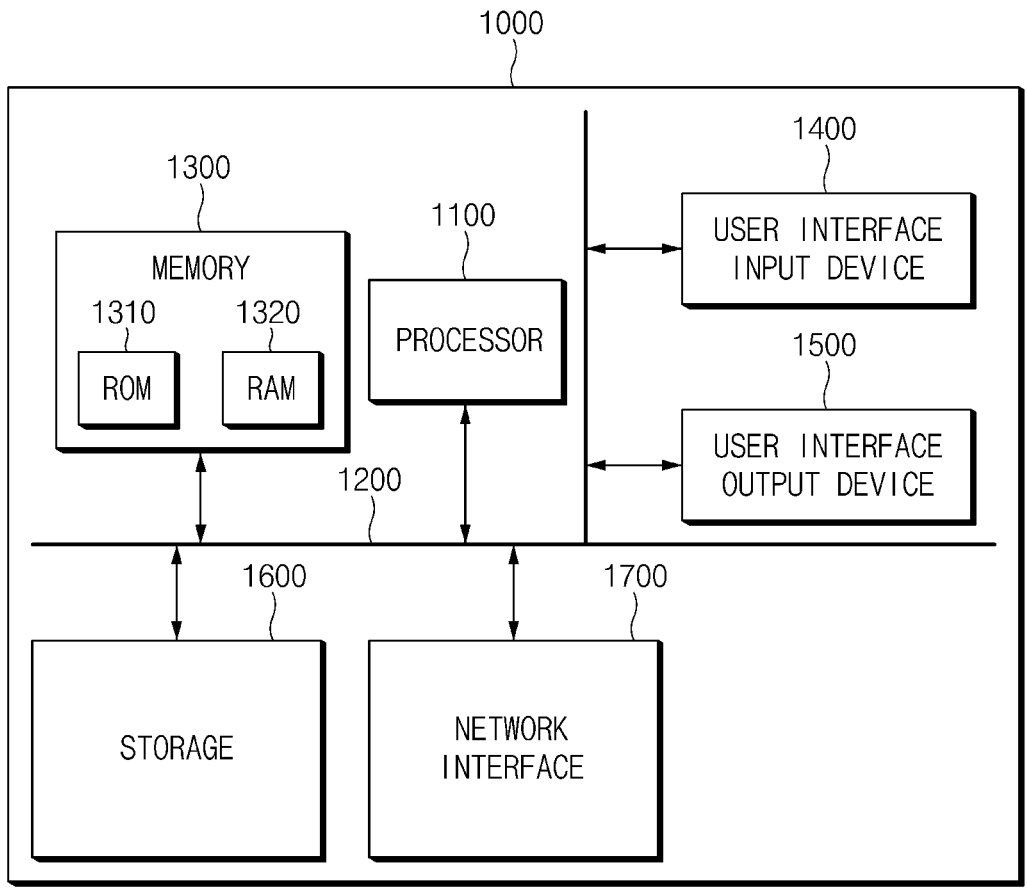
FIG. 8 illustrates a computing system about a user awareness device, a user awareness system, and a user awareness method according to an embodiment of the present disclosure.

FIG. 8 illustrates a computing system about a user awareness device, a user awareness system, and a user awareness method according to an embodiment of the present disclosure.

Referring to FIG. 8, a computing system 1000 about the user awareness device, the user awareness system, and the user awareness method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the methods or algorithms described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the user awareness device, the user awareness system, and the user awareness method according to an embodiment of the present disclosure.

According to at least one of embodiments of the present disclosure, robot devices may share user information using a cloud environment to prevent a redundant service from being provided to users and provide the user with a personalized service.

Furthermore, according to at least one of embodiments of the present disclosure, the user awareness device may share trial ride information between a vehicle and a robot to provide a user with an additional service based on the trial ride information.

Furthermore, according to at least one of embodiments of the present disclosure, as robot devices share user information using a cloud environment, robot devices located in different places as well as the same place may provide a service by means of a user history.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for illustrative purposes. The scope of the present disclosure should be construed on the basis of the accompanying claims, and all the technical ideas within the scope equivalent to the claims should be included in the scope of the present disclosure.

What is claimed is:

1. A device comprising:
a communication module; and
at least one processor electrically connected with the communication module,
wherein the at least one processor is configured to:
receive first information about a first user from a first device through the communication module, wherein the first device includes a test drive vehicle;
specify the first user based on a result of comparing the first information with pre-registration information;
transmit data corresponding to a first service to the first device to provide the first user with the first service based on the pre-registration information;
receive data on a history of the first service from the first device through the communication module;
receive second information about a second user from a second device through the communication module;

compare the first information with the second information to determine whether the second user is the same as the first user; and transmit data corresponding to a second service associated with the first service based on the data on the history of the first service to the second device to provide the second user with the second service based on a determination that the second user is the same as the first user, wherein the second service includes a service consecutive to the first service, wherein the data on the history of the first service includes information about the first service, wherein the data on the history of the first service further includes trial ride information of the first user about the first service or behavior information of the first user about the first service, wherein the trial ride information or the behavior information is collected from the test drive vehicle of the first user; and wherein the data on the history of the first service comprises at least one of a driver tendency, a driving distance, or a driving speed.

2. The device of claim 1, wherein:

the pre-registration information comprises at least one of name information, age information, gender information, face information, preferred vehicle information, or visit information; and each of the first information and the second information includes at least one of appearance information, face information, utterance information, touch information, age information, or gender information.

3. The device of claim 1, wherein the second service comprises a service personalized for the second user based on the data on the history of the first service.

4. The device of claim 1, wherein the at least one processor is configured to:

receive a request to search for the second user from the second device through the communication module; and determine whether the second user is the same as the first user based on the request.

5. The device of claim 1, wherein the at least one processor is configured to:

obtain motion information of the first user using deep-learning; and determine whether the second user is the same as the first user based on the motion information of the first user.

6. The device of claim 1, wherein the at least one processor is configured to:

obtain interest information about the first user based on at least one of the first information or the data on the history of the first service; and update the interest information in a cloud such that the interest information is shared.

7. The device of claim 1, wherein:

the second device comprises a robot device or a second vehicle; and the at least one processor is configured to obtain the data on the history of the first service from the first device.

8. A method comprising:

receiving, by at least one processor, first information about a first user from a first device, wherein the first device includes a test drive vehicle;

specifying, by at least one processor, the first user based on a result of comparing the first information with pre-registration information;

transmitting, by at least one processor, data corresponding to a first service to the first device to provide the first user with the first service based on the pre-registration information;

receiving, by at least one processor, data on a history of the first service from the first device;

receiving, by at least one processor, second information about a second user from a second device;

comparing, by at least one processor, the first information with the second information to determine whether the second user is the same as the first user; and transmitting, by at least one processor, data corresponding to a second service associated with the first service based on the data on the history of the first service to the second device to provide the second user with the second service based on a determination that the second user is the same as the first user, wherein the second service includes a service consecutive to the first service, wherein the data on the history of the first service includes information about the first service, wherein the data on the history of the first service further includes trial ride information of the first user about the first service or behavior information of the first user about the first service, wherein the trial ride information or the behavior information is collected from the test drive vehicle of the first user; and wherein the data on the history of the first service comprises at least one of a driver tendency, a driving distance, or a driving speed.

9. The method of claim 8, wherein:

the pre-registration information comprises at least one of name information, age information, gender information, face information, preferred vehicle information, or visit information; and each of the first information and the second information comprises at least one of appearance information, face information, utterance information, touch information, age information, or gender information.

10. The method of claim 8, wherein the second service comprises a service personalized for the second user based on the data on the history of the first service.

11. The method of claim 8, wherein determining whether the second user is the same as the first user comprises:

receiving, by at least one processor, a request to search for the second user from the second device; and determining, by at least one processor, whether the second user is the same as the first user based on the request.

12. The method of claim 8, wherein determining whether the second user is the same as the first user comprises:

obtaining, by at least one processor, motion information of the first user using deep-learning; and determining, by at least one processor, whether the second user is the same as the first user based on the motion information of the first user.

13. The method of claim 8, further comprising:

obtaining, by at least one processor, interest information about the first user based on at least one of the first information or the data on the history of the first service; and updating, by at least one processor, the interest information in a cloud such that the interest information is shared.

14. A system comprising:

a first device includes a test drive vehicle or the test drive vehicle and a first robot device, wherein the first device is configured to recognize a first user, obtain first information about the first user, and provide the first user with a first service;

a second device includes a second robot device or a second vehicle, wherein the second device is configured to recognize a second user, obtain second information about the second user, and provide the second user with a second service; and a server configured to:

receive the first information from the first device, specify the first user based on a result of comparing the first information with pre-registration information, transmit data corresponding to the first service to the first device to provide the first user with the first service based on the pre-registration information, receive data on a history of the first service from the first device, receive the second information from the second device, compare the first information with the second information to determine whether the second user is the same as the first user, and transmit data corresponding to the second service associated with the first service based on the data on the history of the first service to the second device to provide the second user with the second service based on a determination that the second user is the same as the first user, wherein the second service includes a service consecutive to the first service, wherein the data on the history of the first service includes information about the first service, wherein the data on the history of the first service further includes trial ride information of the first user about the first service or behavior information of the first user about the first service, wherein the trial ride information or the behavior information is collected from the test drive vehicle of the first user; and wherein the data on the history of the first service comprises at least one of a driver tendency, a driving distance, or a driving speed.

15. The system of claim 14, wherein the pre-registration information comprises at least one of name information, age information, gender information, face information, preferred vehicle information, or visit information; and wherein each of the first information and the second information comprises at least one of appearance information, face information, utterance information, touch information, age information, or gender information.

16. The system of claim 14, wherein the second service comprises a service personalized for the second user based on the data on the history of the first service.

17. The system of claim 14, wherein the server is configured to:

receive a request to search for the second user from the second device; and determine whether the second user is the same as the first user based on the request.

18. The system of claim 14, wherein the server is configured to:

obtain motion information of the first user using deep-learning; and determine whether the second user is the same as the first user based on the motion information of the first user.

19. The system of claim 14, wherein the server is configured to:

obtain interest information about the first user based on at least one of the first information or the data on the history of the first service; and update the interest information in a cloud such that the interest information is shared.

20. The system of claim 19, wherein the server is configured to:

obtain motion information of the first user using deep-learning; and determine whether the second user is the same as the first user based on the motion information of the first user.

* * * * *